United States Patent [19]

Kawakubo et al.

[11] Patent Number: 4,863,649
[45] Date of Patent: Sep. 5, 1989

[54] PROCESS FOR PRODUCING CARBON HEAT GENERATOR

[75] Inventors: Takamasa Kawakubo, Gunma; Takao Koyama, Fujioka, both of Japan

[73] Assignee: Mitsubishi Pencil Co., Ltd., Tokyo, Japan

[21] Appl. No.: 150,333

[22] Filed: Jan. 29, 1988

[51] Int. Cl.$^4$ .............................................. C01B 31/02
[52] U.S. Cl. .................................. 264/29.6; 204/294; 423/449
[58] Field of Search ..................... 264/29.1, 29.6, 29.7; 423/449; 204/294

[56] References Cited

U.S. PATENT DOCUMENTS

| | | | |
|---|---|---|---|
| 3,065,088 | 11/1962 | Janes et al. | 264/29.7 X |
| 3,089,195 | 5/1963 | Woodburn, Jr. | 264/29.7 |
| 3,202,619 | 8/1965 | LeBaron | 264/29.7 X |
| 4,221,773 | 9/1980 | Tsukagoshi et al. | 264/29.1 X |
| 4,376,029 | 3/1983 | Joó et al. | 264/29.7 X |
| 4,439,382 | 3/1984 | Joó et al. | 264/29.6 X |

FOREIGN PATENT DOCUMENTS

| | | | |
|---|---|---|---|
| 1157242 | 11/1983 | Canada | 264/29.1 |
| 57-135775 | 8/1982 | Japan | 423/449 |
| 1535440 | 12/1978 | United Kingdom | 264/29.7 |

Primary Examiner—Jeffery Thurlow
Assistant Examiner—Leo B. Tentoni
Attorney, Agent, or Firm—Oliff & Berridge

[57] ABSTRACT

A process for producing a carbon heat generator is disclosed including the steps of uniformly dispersing one or more types of metal compounds capable of forming a vitreous film upon oxidation in a moldable composition, molding the resultant dispersed composition, precarbonizing the molded composition, and then carbonizing the composition in a nonoxidative atmosphere to form a carbon heat generator having an oxidation preventive glass film. The oxidation of the metal compound exposed on the surface of the molded composition by the use of an oxidative atmosphere forms a vitreous film which prevents oxygen from diffusing in the interior thereof. The film so produced can form a new glass film on a damaged portion by a self-recovery effect if a pinhole or a crack occurs in the glass film. Thus, the process does not cause external appearance and weight differences before and after heat generating.

4 Claims, 1 Drawing Sheet

FIG. 1
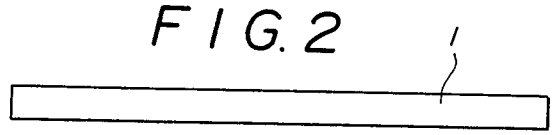
FIG. 2
FIG. 3
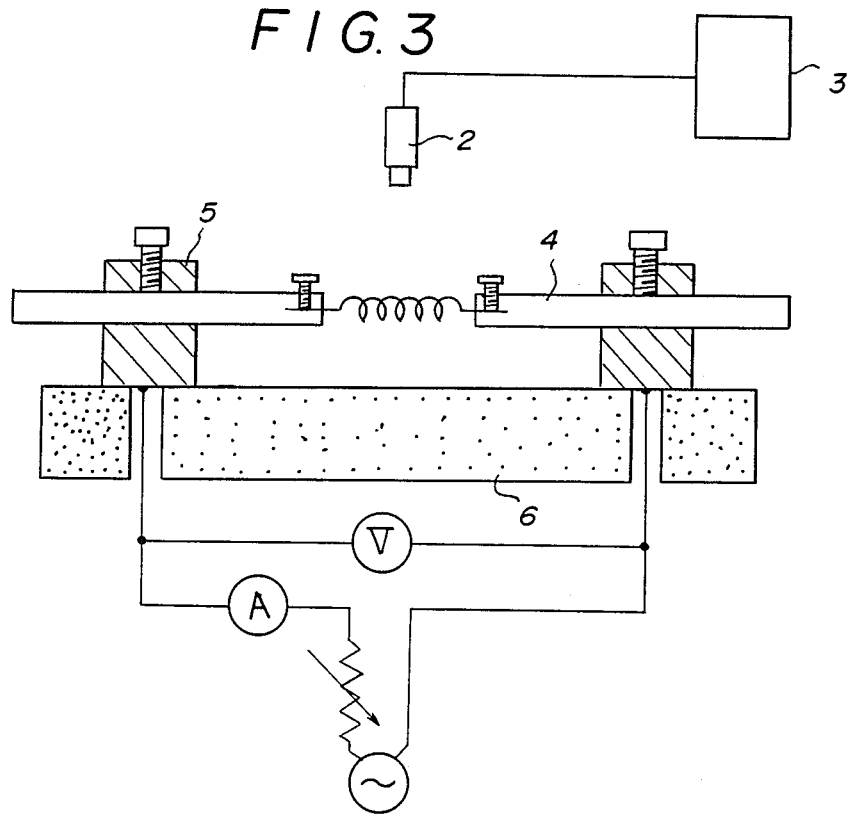

PROCESS FOR PRODUCING CARBON HEAT GENERATOR

BACKGROUND OF THE INVENTION

The present invention relates to a process for producing a carbon heat generator and, more particularly, to such a process permitting manufacture of oxidation resistant carbon heat generator to be used in the air and having free moldability.

A carbon material has excellent heat resistance, thermal impact resistance and corrosion resistance to be expected as a heat generator material. However, the carbon is reacted with gas, such as oxygen, carbon dioxide or steam to be oxidized and consumed. This phenomenon causes the carbon to be a large disturbance in case of using as a heat generator in the air. Accordingly, the conventional carbon heat generator has had a drawback that the carbon can be used only in inactive atmosphere. Thus, recently, various methods for providing oxidation resistance in a carbon material without coating the heat resistant surface with oxidation resistant material have been developed. For example, a process for producing a carbon-ceramic composite material (Japanese Patent Laid-open No. 140,075/1981) filed and assigned to Kyushu Industrial Institute of Technology, in Japan, which provides carbon-ceramic composite material mainly containing as raw material pulverized crude coke. Since this process employs the crude coke as a carbon source, it has such a disadvantage that the process cannot obtain an oxidation resistant carbon material having free moldability due to complicated configuration, such as a coil shape.

To develop a heat resistant heat generator usable in the air with free moldability, the inventors have undertook a study and have started from two concepts, one of which complexes metal compound to form uniform vitreous property when effecting air oxidation in a heat resistant matrix to provide self-recovery for an oxidation resistant film to prevent oxygen from diffusing in the interior and the other of which uses synthetic resin as a pretreated carbon to mold equivalently to a normal plastic molding to uniformly disperse metal compound in synthetic resin.

From the result of the study, the fact that metal compound was uniformly dispersed in synthetic resin, molded in a round-rod shape and carbonized to prevent oxygen from diffusing in the interior thereof due to the construction of uniform vitreous film by the oxidation of the exposed metal compound in the step of oxidizing to consume the carbon on the surface in an oxidative atmosphere so that carbon heat generator thereby stably generates heat without oxidation even in the air has been discovered.

The present invention is devised on the basic of the abovementioned discovery and comprises the steps of uniformly kneading composition, such as synthetic resin exhibiting moldability and high carbon residual yield after calcining, metal compound forming vitreous property in air oxidation and carbon powder to obtain a molding composition, molding the composition in a free shape, carbon pretreating the molded composition in an air oven, and then carbonizing the composition in an inert gas atmosphere. Even if the carbon heat generator thus provided is heated at 800° C. for 30 hours in the air, there are observed almost no external appearance and weight differences before and after the heat generating.

SUMMARY OF THE INVENTION

Accordingly, an object of the present invention is to provide a process for producing a carbon heat generator which can eliminate the above-mentioned drawbacks and does not cause external appearance and weight differences before and after heat generating.

BRIEF DESCRIPTION OF THE DRAWINGS

The above and other related objects and features of the invention will be apparent from a reading of the following description of the disclosure found in the accompanying drawings and novelty thereof pointed out in the appended claims.

FIG. 1 is a side view showing a coiled heat generator of the present invention;

FIG. 2 is a view showing a rod-like heat generator of the invention; and

FIG. 3 is a schematic view of an apparatus for testing an oxidation resistance.

DESCRIPTION OF THE PREFERRED EMBODIMENTS

An embodiment of a process for producing a carbon heat generator according to the present invention will now be described in detail. The present invention is not limited to the particular embodiment. Various other changes and modification may be made within the spirit and scope of the present invention.

[Example 1]

200 g of chlorinated vinyl chloride, 175 g of graphite powder having particle size of approx. 10 microns or smaller, 75 g of boron carbide powder having particle size of approx. 10 microns or smaller, 50 g or smaller of silicon carbide powder having particle size of 10 microns or smaller and 100 g of diarylphthalate monomer were mixed in a Henschel mixer at room temperature for 30 min., the resultant mixture was kneaded by two rolls, and then molded in a film shape. This film was then extruded by a plunger in a round rod having 2 mm in diameter. The resultant round-rod-like wire was shaped in a spring shape as shown in FIG. 1, treated at the temperature rising velocity of 5° C./hr up to 180° C. in an air oven, then heated at the temperature rising velocity of 5° C./hr up to 300° C. in nitrogen gas atmosphere in a lateral tubular furnace, further at 20° C./hr up to 1100° C., then allowed at 1100° C. to stand for 3 hours, and then naturally cooled.

The coiled carbon heat generator obtained in the above-mentioned steps was tested for oxidation resistance by an electric heating system in an apparatus shown in FIG. 3 in the air. The result is shown in Table 1. As shown in Table 1, almost no changes in weight and external appearance were observed before and after the heat generating. Further, the heat generator has stably generated heat through the oxidation resistance test.

[Example 2]

400 g of furan resin, 350 g of graphite powder having particle size of 10 microns or smaller, 150 g of boron carbide having particle size of 10 microns or smaller and 100 g of silicon carbide powder having particle size of 10 microns or smaller were kneaded at room temperature for 30 min., the resultant kneaded mixture was further kneaded by two rolls, then molded in a sheet shape, and extruded in a round-rod shape having 2 mm in of 100 mm as shown in FIG. 2, then heated at temperature rising velocity of 5° C./hr up to 180° C. in an air oven, then heated at 5° C./hr up to 300° C. in nitrogen gas atmosphere in a lateral electric furnace shown in FIG. 3, further at 20° C./hr up to 1100° C., allowed at 1100° C. to stand for 3 hours, and then naturally cooled. The round rod thus obtained was tested for oxidation resistance by an electric heating system in an apparatus shown in FIG. 3. The result is shown in Table 1. As shown in Table 1, almost no changes in weight and external appearance were observed before and after heat generating. Further, the heat generator has stably generated heat through the oxidation resistance test.

What is claimed is:

1. A process for producing a carbon heat generator comprising the steps of uniformly dispersing at least one metal compound capable of forming a vitreous film by oxidation in a moldable composition which exhibits high carbon residual yield after calcining, molding the resultant dispersed composition, precarbonizing the molded composition to form an oxidation preventive glass film on the surface thereof, and then carbonizing the composition in a nonoxidizing atmosphere.

2. The process according to claim1, wherein said metal compound is selected from the group consisting of metal carbide, metal boride, metal nitride, metal silicide, carbide by gas atmosphere at calcining time, boride, nitride and silicide.

3. The process according to claim 1, wherein said composition contains a synthetic resin.

4. The process according to claim 1, wherein said composition contains carbon powder.

* * * * *